(No Model.)
J. H. ROHME.
CONTROLLING MECHANISM FOR POWER DRIVEN MACHINERY.
No. 336,350. Patented Feb. 16, 1886.
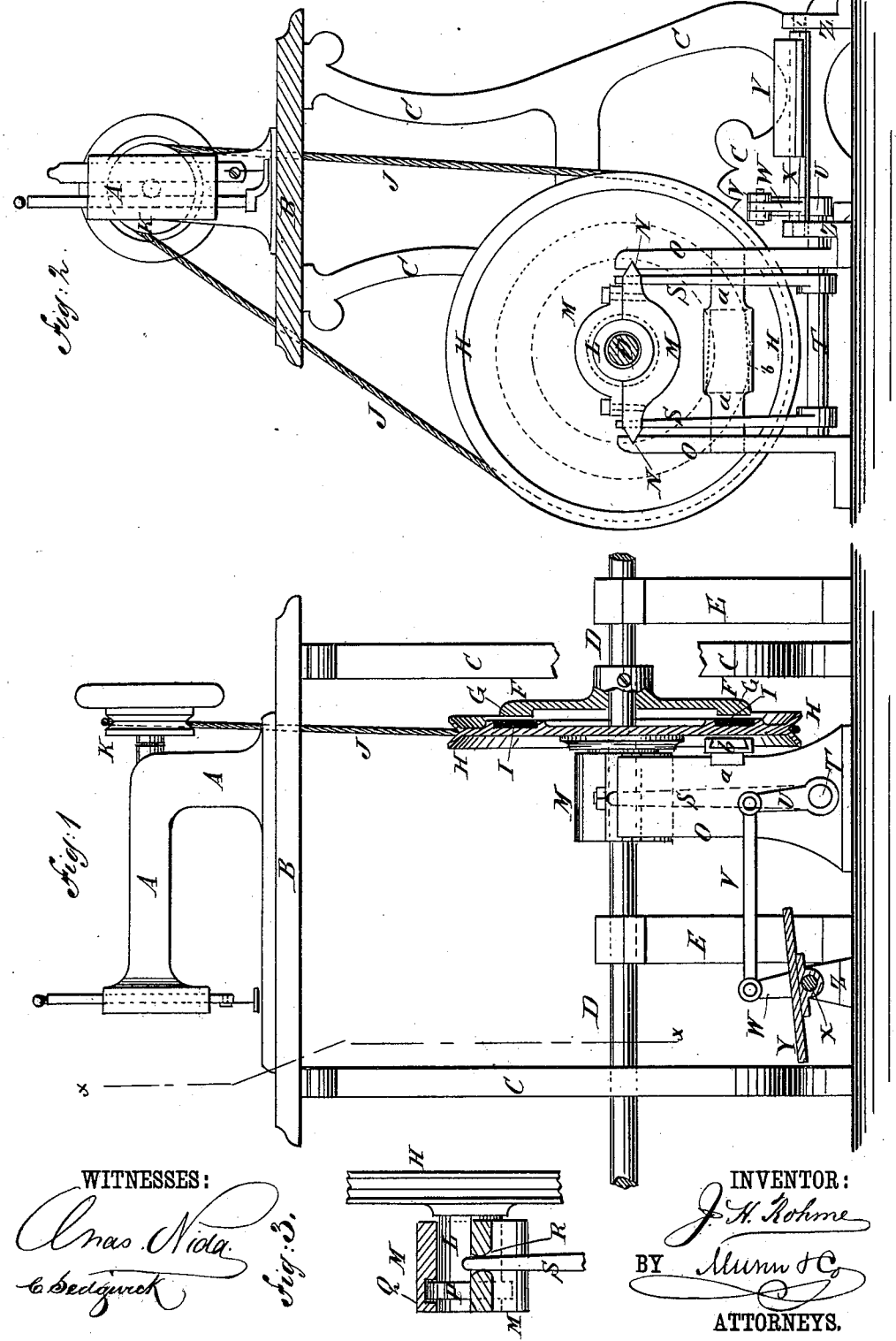
WITNESSES:
INVENTOR:
J. H. Rohme
BY Munn & Co
ATTORNEYS.

UNITED STATES PATENT OFFICE.

JAMES H. ROHME, OF NEWBURG, NEW YORK.

CONTROLLING MECHANISM FOR POWER-DRIVEN MACHINERY.

SPECIFICATION forming part of Letters Patent No. 336,350, dated February 16, 1886.

Application filed December 30, 1885. Serial No. 187,125. (No model.)

*To all whom it may concern:*

Be it known that I, JAMES H. ROHME, of Newburg, in the county of Orange and State of New York, have invented a new and useful Improvement in Controlling Mechanism for Power-Driven Machinery, of which the following is a full, clear, and exact description.

Reference is to be had to the accompanying drawings, forming a part of this specification, in which similar letters of reference indicate corresponding parts in all the figures.

Figure 1 is a front elevation of my improved mechanism, partly in section and part being broken away, shown as applied to a sewing-machine. Fig. 2 is a sectional side elevation of the same, taken through the line x x, Fig. 1. Fig. 3 is a sectional elevation of the driving-pulley bearing, part of the driving-pulley being broken away.

The object of this invention is to provide controlling mechanism for power-driven machinery, by the use of which the said machinery can be instantly started or stopped or made to run at greater or less speed, and which shall be simple in construction and reliable in operation.

The invention consists in the construction and combination of various parts of the mechanism, as will be hereinafter fully described.

A represents a sewing-machine, B the sewing-machine table, and C the frame. D is the driving-shaft, which revolves in bearings in standards E, attached to the floor of the room or in other suitable supports. F is the drive-wheel, the hub of which is secured to the driving-shaft D by set-screws or other suitable means. Upon the side of the drive-wheel F is formed an annular flange or rib, G, to enter a groove, I, in the side of the driving-pulley H, placed upon the shaft D, and thus drive the said pulley by friction. The face of the driving-pulley H is grooved to receive the driving-belt J, which also passes around a pulley, K, attached to the shaft of the sewing-machine A, or other machinery to be driven. The hub L of the driving-pulley H, upon the side of the said pulley opposite the drive-wheel F, is extended and revolves in a bearing, M, the ends of the lower part of which slide horizontally in grooves N in the inner sides of the upper ends of standards O attached to the floor of the room. The bore of the hub L is made larger than the driving-shaft D, and the bearing M is concentric with the said shaft, so that the said hub will always be out of contact with the said shaft.

Upon the hub L, near its outer end, is formed an annular rib or flange, P, which fits into an annular groove, Q, in the inner surface of the bearing M, so that the driving-pulley H can be moved out of and into gear with the drive-wheel F by moving the said bearing M.

In the end parts of the bearing M are formed short slots R, to receive the upper ends of two arms, S, formed upon or rigidly attached to a shaft, T, that rocks in bearings in the lower parts of the standards O. To one end of the rock-shaft T is rigidly attached an arm, U, to the end of which is pivoted the end of the short connecting-rod V. The other end of the connecting-rod V is pivoted to the end of an arm, W, attached to the inner end of the shaft X, to which the treadle Y is attached, and which rocks in bearings Z, attached to the floor of the room.

With this construction the feet of the operator rest upon the treadle Y, upon the opposite sides of and parallel with the axis of the said treadle, so that by bearing down upon the said treadle with one foot the driving-pulley H will be moved into and held in contact with the drive-wheel F, and the said pulley will be revolved with greater or less speed, according as it is held against the said driving-wheel with greater or less force. By bearing down upon the treadle with the other foot the driving-pulley H will be withdrawn from the drive-wheel F.

To the sides of the standards O are secured the ends of a bar, a, having upon its middle part a projection in which is formed a dovetailed groove to receive the brake-shoe b, so that the said brake-shoe can be readily removed, when worn, and replaced by a new one, the said groove being so formed that the friction of the driving-pulley H will hold the said brake-shoe firmly in place. The projection of the middle part of the brake-bar a is such that the driving-pulley H, when drawn out of gear with the drive-wheel F, will be brought into contact with the brake-shoe b, so that its motion can be stopped instantly or slowly, according as it is held against the said brake-shoe with more or less force.

Having thus fully described my invention, I claim as new and desire to secure by Letters Patent—

1. The combination, with the driving-shaft D and the drive-wheel F, rigidly attached thereto, of the driving-pulley H, placed loosely upon the said driving-shaft and having an annular rib, P, upon its projecting hub L, the sliding hub-bearing M, having an interior annular groove, Q, to receive the rib of the said hub, and a shifting mechanism, substantially as herein shown and described, whereby the said driving-pulley can be thrown into and out of contact with the said drive-wheel by moving the said bearing, as set forth.

2. The combination, with the sliding bearing M, carrying the driving-pulley H, of the rock-shaft T, having arms S U, the connecting-rod V, and the treadle W X Y, substantially as herein shown and described, whereby the said bearing can be moved to throw the driving-pulley into and out of gear by rocking the said treadle, as set forth.

3. The combination, with the standards O, that support the bearing M and the driving-pulley H, of the stationary brake-bar $a$ and the brake-shoe $b$, substantially as herein shown and described, whereby the said brake will come in contact with the said driving-pulley when drawn out of contact with the drive-wheel, as set forth.

JAMES H. ROHME.

Witnesses:
L. S. STERRIT,
NEHEMIAH FOWLER.